(12) United States Patent
Gustafsson et al.

(10) Patent No.: US 9,690,604 B2
(45) Date of Patent: *Jun. 27, 2017

(54) LANGUAGE-BASED MODEL FOR ASYNCHRONOUS OPERATIONS

(71) Applicant: Microsoft Technology Licensing, LLC, Redmond, WA (US)

(72) Inventors: Niklas Gustafsson, Bellevue, WA (US); Geoffrey M. Kizer, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/408,011

(22) Filed: Jan. 17, 2017

(65) Prior Publication Data
US 2017/0123776 A1 May 4, 2017

Related U.S. Application Data

(63) Continuation of application No. 12/479,186, filed on Jun. 5, 2009, now Pat. No. 9,547,511.

(51) Int. Cl.
*G06F 9/44* (2006.01)
*G06F 9/45* (2006.01)
*G06F 9/455* (2006.01)

(52) U.S. Cl.
CPC ............ *G06F 9/45516* (2013.01); *G06F 8/40* (2013.01); *G06F 8/41* (2013.01); *G06F 8/45* (2013.01); *G06F 8/458* (2013.01)

(58) Field of Classification Search
None
See application file for complete search history.

(56) References Cited

U.S. PATENT DOCUMENTS 6,415,299 B1  7/2002 Baisley et al.
6,928,648 B2  8/2005 Wong et al.
(Continued)

OTHER PUBLICATIONS

'Lecture 10 Linked List Operations' by Ananda Gunawardena, copyright 2009.*

(Continued)

*Primary Examiner* — Steven Snyder
(74) *Attorney, Agent, or Firm* — Dicke, Billig & Czaja, PLLC

(57) ABSTRACT

A language-based model to support asynchronous operations set forth in a synchronous syntax is provided. The asynchronous operations are transformed in a compiler into an asynchronous pattern, such as an APM-based pattern (or asynchronous programming model based pattern). The ability to compose asynchronous operations comes from the ability to efficiently call asynchronous methods from other asynchronous methods, pause them and later resume them, and effectively implementing a single-linked stack. One example includes support for ordered and unordered compositions of asynchronous operations. In an ordered composition, each asynchronous operation is started and finished before another operation in the composition is started. In an unordered composition, each asynchronous operation is started and completed independently of the operations in the unordered composition.

20 Claims, 3 Drawing Sheets

(56) References Cited

U.S. PATENT DOCUMENTS

| | | |
|---|---|---|
| 7,010,787 B2 | 3/2006 | Sakai |
| 7,159,211 B2 | 1/2007 | Jalan et al. |
| 7,162,718 B1 | 1/2007 | Brown et al. |
| 7,162,722 B1 | 1/2007 | Supinski et al. |
| 7,248,603 B1 | 7/2007 | Grunkemeyer et al. |
| 7,280,558 B1 | 10/2007 | Grunkemeyer et al. |
| 7,349,913 B2 | 3/2008 | Clark et al. |
| 7,484,664 B2 | 2/2009 | Shafer |
| 7,503,052 B2 | 3/2009 | Castro et al. |
| 7,587,584 B2 | 9/2009 | Enright et al. |
| 7,707,547 B2 | 4/2010 | Colton et al. |
| 7,707,564 B2 | 4/2010 | Marvin et al. |
| 7,752,633 B1 | 7/2010 | Fleming |
| 7,783,470 B2 | 8/2010 | Kahlon |
| 8,572,585 B2 | 10/2013 | Toub et al. |
| 9,411,568 B2 | 8/2016 | Syme et al. |
| 2002/0156839 A1 | 10/2002 | Peterson et al. |
| 2003/0008684 A1 | 1/2003 | Ferris |
| 2003/0023656 A1 | 1/2003 | Hutchison et al. |
| 2003/0167358 A1 | 9/2003 | Marvin et al. |
| 2003/0225825 A1 | 12/2003 | Healey et al. |
| 2004/0103405 A1 | 5/2004 | Vargas |
| 2005/0021689 A1 | 1/2005 | Marvin et al. |
| 2005/0188350 A1 | 8/2005 | Bent et al. |
| 2005/0246692 A1 | 11/2005 | Poteryakhin et al. |
| 2006/0036426 A1 | 2/2006 | Barr et al. |
| 2007/0011334 A1 | 1/2007 | Higgins et al. |
| 2007/0094336 A1 | 4/2007 | Pearson |
| 2008/0082017 A1 | 4/2008 | Savic |
| 2008/0134135 A1 | 6/2008 | Elaasar |
| 2008/0196025 A1 | 8/2008 | Meijer et al. |
| 2008/0216060 A1 | 9/2008 | Vargas |
| 2008/0229278 A1 | 9/2008 | Liu et al. |
| 2008/0271042 A1 | 10/2008 | Musuvathi et al. |
| 2008/0288834 A1 | 11/2008 | Manovit et al. |
| 2009/0077573 A1 | 3/2009 | Moorthy et al. |
| 2009/0150422 A1 | 6/2009 | Meijer et al. |
| 2009/0204969 A1 | 8/2009 | Abadi et al. |
| 2009/0228904 A1 | 9/2009 | Meijer et al. |
| 2009/0300591 A1 | 12/2009 | Duffy et al. |
| 2009/0322739 A1 | 12/2009 | Rubin et al. |
| 2010/0138780 A1 | 6/2010 | Marano et al. |
| 2010/0313184 A1 | 12/2010 | Gustafsson et al. |
| 2011/0173595 A1* | 7/2011 | Gustafsson ............. G06F 8/433 717/146 |
| 2011/0258594 A1 | 10/2011 | Syme et al. |
| 2012/0324457 A1* | 12/2012 | Toub ........................ G06F 8/45 718/102 |

OTHER PUBLICATIONS

"Implementing the Asynchronous Programming Model with Future<T>", retrieved at <<http://blogs.msdn.com/pfxteam/archive/2008/02/29/7960146.aspx>>, pp. 7.

"Asynchronous Programming Overview", retrieved at <<http://msdn.microsoft.com/en-us/library/ms228963(VS.80).aspx>>, pp. 5.

"Performing Asynchronous Operations", retrieved at <<http://msdn.microsoft.com/en-us/library/zw97wx20(VS.80).aspx>>, pp. 2.

"Charles", "Jeffrey Richter and his AsyncEnumerator", retrieved at <<http://channel9.msdn.com/posts/Charles/Jeffrey-Richter-and-his-AsyncEnumerator/>>, Dec. 3, 2008. pp. 4.

"An Overview of Key New Visual Studio 2005 Features", retrieved at <<http://msdn.microsoft.com/en-us/library/ms364072(VS.80).aspx>>, Nov. 2005. pp. 54.

"Hrishikeshdewan", "Asynch Programming Pattern and Model", retrieved at <<http://csharpusersgroup.wordpress.com/2007/12/29/asynch-programming-pattern-and-model/>>, Dec. 29, 2007. pp. 4.

The Office Action for U.S. Appl. No. 12/479,186 mailed Mar. 21, 2012 (13 pgs.).

The Final Office Action for U.S. Appl. No. 12/479,186 mailed Oct. 5, 2012 (12 pgs.).

The Office Action for U.S. Appl. No. 12/479,186 mailed Nov. 27, 2013 (13 pgs.).

The Final Office Action for U.S. Appl. No. 12/479,186 mailed Jun. 19, 2014 (15 pgs.).

The Office Action for U.S. Appl. No. 12/479,186 mailed Jan. 16, 2015 (16 pgs.).

The Office Action for U.S. Appl. No. 12/479,186 mailed Jul. 31, 2015 (16 pgs.).

The Final Office Action for U.S. Appl. No. 12/479,186 mailed Feb. 9, 2016 (20 pgs.).

The Notice of Allowance for U.S. Appl. No. 12/479,186 mailed Sep. 12, 2016 (9 pgs.).

"ASYNC Loop Constructs for Relaxed Synchronization" by Russell Meyers and Zhiyuan Li, 21th Annual Workshop on Languages and Compilers for Parallel Computing (LCPC 2008), Edmonton, Alberta, Canada, Jul. 31 Aug. 2, 2008.

* cited by examiner

LANGUAGE-BASED MODEL FOR ASYNCHRONOUS OPERATIONS

CROSS-REFERENCE TO RELATED APPLICATIONS

This patent application is a continuation of Ser. No. 12/479,186, filed Jun. 5, 2009, entitled, "LANGUAGE-BASED MODEL FOR ASYNCHRONOUS OPERATIONS," which is incorporated herein by reference.

BACKGROUND

Application programming interfaces (APIs) that require waiting for a non-deterministically and relatively long time, such as accessing network resources or reading files from a storage media, in an application can be performed as synchronous or asynchronous operations.

Synchronous operations stall the application and other operations until the synchronous operation is complete. Synchronous syntax in computer programs is generally straightforward and familiar to developers, and many developers have little or no difficulties writing synchronous operations. An application using synchronous operations, however, can hold on to valuable computing resources while the synchronous operations complete, and thus synchronous operations can be very expensive if the network resources of files are not readily available.

Asynchronous operations, on the other hand, are used to avoid stalling the application and allow the computing resources to perform other useful work while the operation completes. For example, if an asynchronous operation pauses because the application is waiting for a response from a local storage media, a website server, or the like, the computing resources are released to perform other valuable work, and the asynchronous operation will resume with the computing resources after the application has received the file or download.

Managed environments, such as .NET available from Microsoft Corporation of Redmond, Wash., provide for several ways of defining and implementing asynchronous operations. A commonly used way is to use an Asynchronous Programming Model (APM). The APM defines an asynchronous operation as including two functions with the typical shape as: IAsyncResult BeginXXX(<<args-1>>, AsynchCallback cb, object state); int EndXXX (IAsyncResult ar, <<args-2>>);
where IAsynchResult represents the status of the operation, "XXX" is the name of the operation, "args-1" is the list of the in- and ref-parameters, and "args-2" is the list of the out- and ref-parameters of the operation.

Although asynchronous operations provide the benefit of increased workflow, asynchronous operations as currently defined and implemented presents difficulties for many developers. One difficulty includes scaling, or providing for multiple requests, and chaining together requests in a loop as complications quickly arise as more requests are introduced. Also, many developers find composing larger asynchronous operations from existing APM-based operations to be a challenge. As the present trend toward integration of software applications with remote serves in an Internet cloud continues, there is a need for more asynchronous code.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The methods and operations described below can be implemented as a method or process, a set of computer instructions, such as computer software, on a computer readable medium, or the like. In one example, the description of the embodiments provides a language-based model to support asynchronous operations set forth in a synchronous syntax, such as using keywords like "async" to define the asynchronous operations. The asynchronous operations are transformed in a compiler into an asynchronous pattern, such as an APM-based pattern. The ability to compose asynchronous operations comes from the ability to efficiently call asynchronous methods from other asynchronous methods, pause them and later resume them, and effectively implementing a single-linked stack. One example includes support for ordered and unordered compositions of asynchronous operations. In an ordered composition, each asynchronous operation is started and finished before another operation in the composition is started. In an unordered composition, each asynchronous operation is started and completed independently of the operations in the unordered composition.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
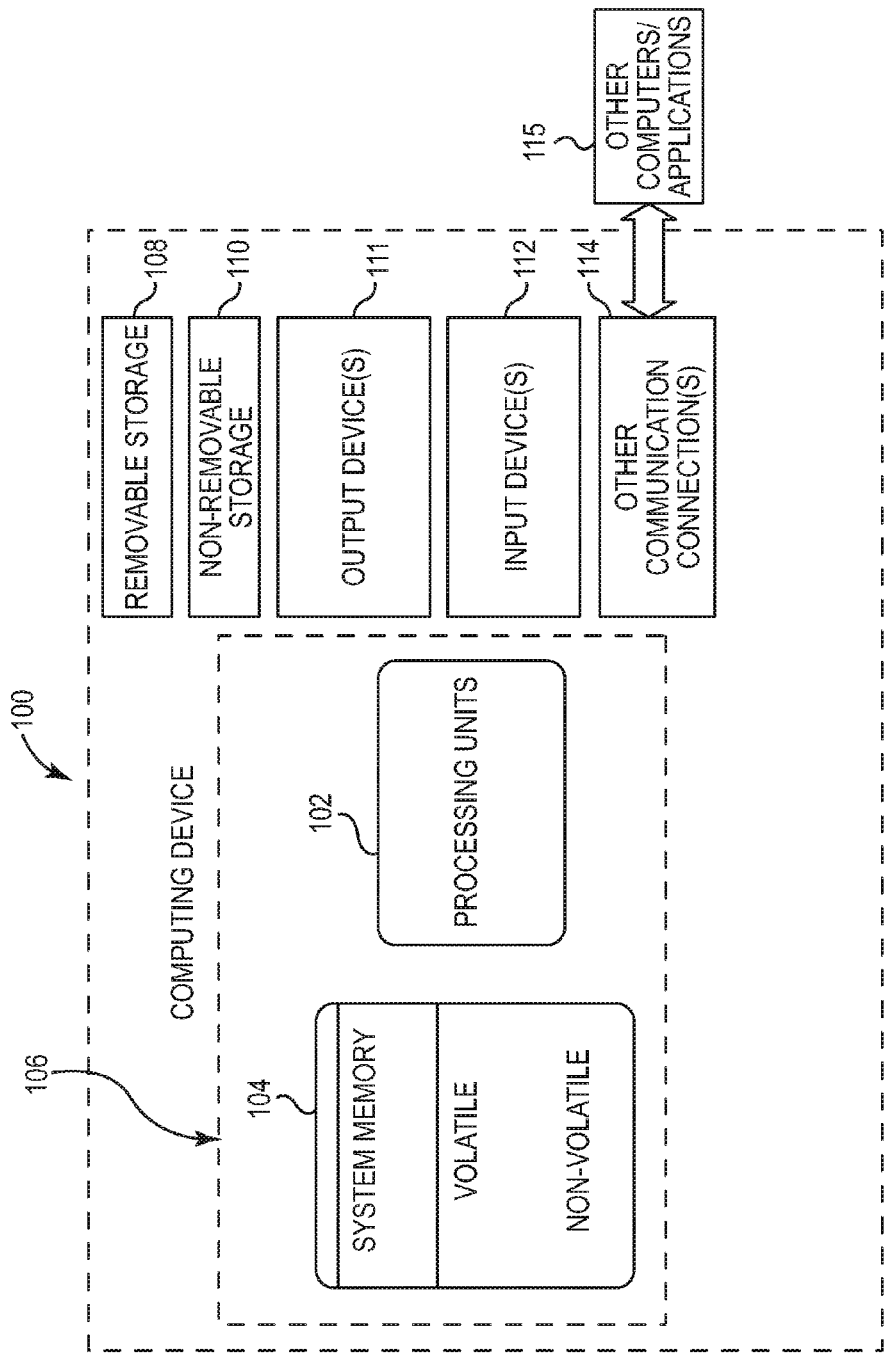
FIG. 1 is a block diagram illustrating an example computing system.

FIG. 1 illustrates an exemplary computer system that can be employed as an operating environment includes a computing device, such as computing device 100. In a basic configuration, computing device 100 typically includes a processor architecture having at least two processing units, i.e., processors 102, and memory 104. Depending on the exact configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device can take one or more of several forms. Such forms include a person computer, a server, a handheld device, a consumer electronic device (such as a video game console), or other.

Computing device 100 can also have additional features or functionality. For example, computing device 100 may also include additional storage (removable and/or non-removable) including, but not limited to, magnetic or optical disks or solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, or the like.

The computing device 100 can be configured to run an operating system software program and one or more software applications, which make up a system platform. In one example, the computing device 100 includes a software component referred to as a managed, or runtime, environment. The managed environment can be included as part of the operating system or can be included later as a software download. The managed environment typically includes pre-coded solutions to common programming problems to aid software developers to create software programs, such as applications, to run in the managed environment. The managed environment typically includes a virtual machine that allows the software applications to run in the managed environment so that the developers need not consider the capabilities of the specific processors 102.

Figure 2:
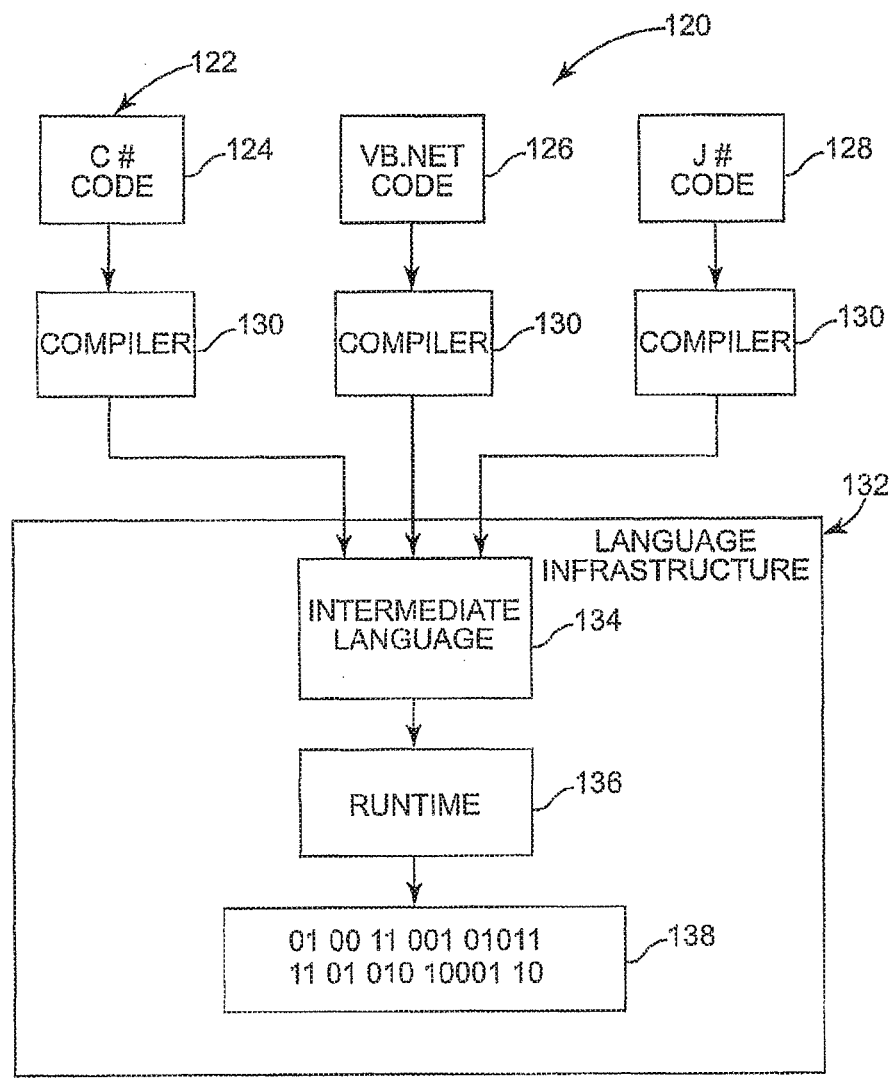
FIG. 2 is a block diagram illustrating one example of a managed environment operating on the computing system of FIG. 1.

FIG. 2 illustrates an example managed, or runtime, environment 120 suitable for operation with the computing device 100. Particular current examples of managed environment frameworks include .NET from Microsoft and Java from Sun Microsystems, Inc. of Santa Clara, Calif., United States, as well as others. The managed environment 120 is configured to accept programs written in a high-level compatible code of one or more programming languages 122. For example, the managed environment can accept programs written in programming languages such as C# (C-sharp) code 124, a visual basic type language such as VB.NET code 126, and/or a Java type language (such as J-sharp) 128. Compilers 130 are configured to compile each compatible code 124, 126, 128. The compiled code can be provided to an infrastructure 132 that describes an executable code and a runtime environment that describes a number of runtimes. An example infrastructure is Common Language Infrastructure (CLI). The infrastructure includes a second compiler 134 that receives the compatible languages and compiles them to a second and platform-neutral intermediate language, such as Common Intermediate Language (CIL). The intermediate language is provided to a runtime compiler 136, such as the Microsoft Common Language Runtime (CLR) in the .NET framework, that compiles the intermediate language into a machine readable code 138 that can be executed on the current platform or computing device.

Figure 3:
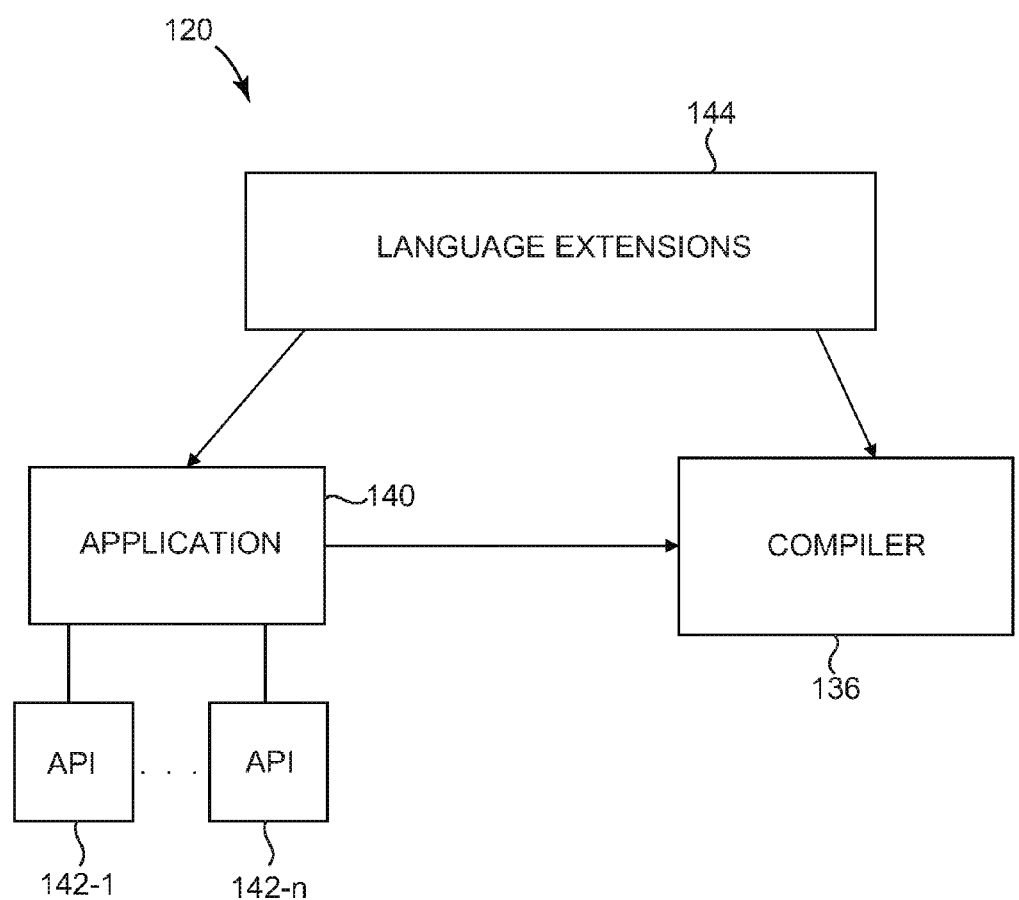
FIG. 3 is a block diagram illustrating an example of the managed environment, such as that illustrated in FIG. 2, implementing a language-based model for composing asynchronous operations according to one embodiment.

FIG. 3 illustrates the managed environment 120 including a language-based model for composing asynchronous operations. The managed environment 120 includes an application or program 140 written in a high level programming language, such as C#. The application 140 includes at least one, but often several, asynchronous operations 142-1 to 142-n. The high level programming language includes support 144 for the asynchronous operations, such as language extensions or keywords, that permit the application 140 to be written in a synchronous style, or synchronous syntax. The language support 144 allows for the compiler, such as the CLR compiler 136 in the .NET framework, to perform restructuring of the code into an asynchronous pattern such as an APM-based pattern. The syntax of the application 140 can include a synchronous look and feel with code comprising one or more synchronous operations but with asynchronous operations instead. The compiler performs the code transformation and provides for pattern-matching-based identification of APM-compliant operations. The code transformations are designated to occur whenever the language support occurs. Appropriate language runtime support for the compiler 136 can be efficiently implemented.

The language based model of FIG. 3 can be implemented through extending the programming language with a keyword, such as "async" in C#, that can be used as a modifier on methods, delegate declarations, and lambda expressions. The language-based model provides several advantages over the standard APM. Among these advantages is that it provides a user-friendly syntax to compose the operations, which allows developers to program as if the operations were merely synchronous interfaces. To this, the model builds on existing, canonical, asynchronous patterns in .NET. The model also supports bridging other, non-conforming, patterns that can be composed in the same syntax. These and other features and advantages will become apparent through the examples listed below.

Whether the modifier is used with a class, structure, or an interface, async methods intrude on the namespace in which they are found. In an example, async method "F" is represented in the compiler 136 by three public declarations such as the name "F," "'BeginF"' and "EndF."' are introduced and used by the compiler 136. The name "F" is used to call the method synchronously, and "BeginF" and "EndF" are implementations of the APM for the operation "F". An additional method called "CreateAsyncF" is used by the compiler 136 in an example. In this example, the name generated with the compiler does not intrude on the developer's namespace. On alternative example to namespace intrusion is to introduce a public class to contain the additional methods. This can alter the binding of "F" from a method to a type, which might lead to overloading of asynchronous methods.

The ability to compose asynchronous operations comes from the ability to efficiently call asynchronous methods from other asynchronous methods, pause them and later resume them, effectively implementing a single-linked stack. Locals are hoisted and call sites transformed.

The language-based model can support features such as ordered compositions. An ordered composition includes calls to asynchronous methods that are serialized so that each async operation is completed before the next call in series will start.

An asynchronous method may contain yield points, or places where the method will pause, that can be represented by calls to other asynchronous methods. In one example, once an asynchronous method yields, the entire call chain yields and the outermost caller, an APM Begin method, returns an IAsyncResult instance with IsComplete==false. When the operation that caused the method to yield is completed, the entire call chain is resumed and executes until another yield point is reached. When there are no more yield points, the result of the outermost async method may be computed and the operation completed. At this point, IAsyncResult methodology to signal completion is employed and the code that started the operation can call the End method to retrieve the results of the operation. In situations where the results may be computed without ever yielding, Begin returns with CompletedSychronously==true.

An example implementation is as follows:

EXAMPLE 1

```
public async byte[ ] ReadFileToEnd(string path)
{
    List<byte[ ]> data=new List<byte[ ]>( );
    Stream stream=File.OpenRead(path);
    byte[ ] next=new byte[1024*1024];
    // The compiler will find BeginRead/EndRead and convert the APM API
    // into an asynchronous method call.
    int numRead=stream.Read(next, 0, next.Length);
    while (numRead>0);
    {
    data. Add(next);
    next=new byte[1024*1024];
    numRead=stream.Read(next, 0, next.Length);
    }
    return FoldData(data); // Flatten the list into one long array.
}
```

Example 1 includes a set of "Read" operations composed serially, i.e., each Read is issued after the previous one has been completed. The code appears as a typical synchronous form, except for the declaration or keyword async. The compiler transforms the two instances of "stream. Read" into calls to the corresponding Begin/End pair by relying on the efficient callback version of the interfaces rather than by using WaitHandle or polling.

If after the first read operation issues and the read operation does not immediately complete, the method pauses, such as if it returns "temporarily" and gives up the stack frame it was using. This is similar to an iterator method yielding a value and then returning later on to produce the next one. The code of Example 1, however, does not output data—rather, it brings data into the method. After the read operation finishes, the method is resumed and moves on to the next statement, which is the loop. The method calls further read operations, each of which may pause and be resumed. If any of the operations finish promptly, such as without pausing, the compiler-generated code moves on without returning from the method. When all the operations are complete, the method calls "FoldData," which is a synchronous method that takes the list of byte arrays and concatenates them.

Implementing ReadFileToEnd( ) using the APM and without the language-based support would include writing a few extra hundred lines of code and would rely on an error-propagation model distinct from what is used with synchronous code. The language-based model provides for an easier and less error-prone method for writing asynchronous operations for many developers currently struggling with the APM.

Example 2 provides an exemplary code to read a set of files as a single asynchronous operation:

EXAMPLE 2

```
public async byte[ ][ ] ReadFiles(string [ ] paths)
{
    byte [ ] [ ] result . . .
    for (int i=0, i<paths.Length; i++)
    {
    //Calling an async method from an async method, the compiler
    // provides support.
    result[i]=ReadFiletoEnd(path);
    }
    return result;
}
```

Example 2 also calls a series of asynchronous operations (in this case defined as an asynchronous method) and lets the operations pause and resume as they are run. Just as in the Example 1, each operation is started once the previous operation is complete. Although each file can be read independently, the loop serializes the read operations. Note that when ReadFileToEnd pauses, ReadFiles also pauses— the pausing effect goes from the "leaf" operation all the way out to the outermost method, and the resumption starts at the outermost level and goes in toward the leaf.

Example 3 provides an exemplary invocation of an outermost asynchronous method, which can be ultimately composed.

EXAMPLE 3

```
IAsyncResult ar=BeginReadFiles(paths, ar=>
{
    byte [ ] [ ] fileContents=EndReadFiles(ar);
    . . . // process file contents
});
```

In one example, the outermost frame of any asynchronous operation is started and treated as an APM, such as calling the operation and providing a callback. An alternative would include changing the CLR 136 stack model, which would affect other programming. Otherwise, the code is serialized and strung together in the language-based model as described in the other examples.

Delegate types, anonymous methods and lambdas can be defined as asynchronous by adding 'async' before the 'delegate' keyword: public async delegate int Count(object obj); Action<int> bar=async delegate(int x) { . . . }; bar.BeginInvoke( . . . ); foo(async x=> . . . );

Some examples include a change to the binding of delegates created from asynchronous methods. For instance, the BeginInvoke( ) method is mapped directly to a call to BeginF, while the EndInvoke( ) method is mapped to EndF. In some examples the thread pool is not affected in the execution of BeginInvoke/EndInvoke on a delegate constructed from an asynchronous method. Further, an asynchronous delegate is bound to an asynchronous method by mapping the CreateAsyncInvoke method to CreateAsyncF. The delegate type can be augmented with the CreateAsyncInvoke method in a manner analogous to BeginInvoke and EndInvoke.

In cases of lambdas, the asynchrony can be inferred from context, in which case the async keyword is optional. In such circumstances, it may still be useful to ensure that an error is issued if the compiler cannot find a proper asynchronous overload.

In several examples, often near the leaves of a call chain, the application will encounter a feature that does not include an asynchronous method such as a native call, or an already existing APM API. In this case the application can include a "bridge routine" (such as a "hand-written" bridge routine) that may be called to bridge models. In some examples, the compiler will generate code to invoke any existing Begin/End pair as if it were an asynchronous method without a bridge routine.

Whether another compiled asynchronous method, or a hand-written bridge method, when found within an asynchronous method any invocation expression will cause the compiler to change its name lookup rules and use pattern-matching to look for an asynchronous version of an API.

In an example including a given method F( . . . ), the compiler will look for a BeginF/EndF pair or a CreateAsyncF method with a parameter signature that matches the one used in the invocation expression. The compiler 136 will give preference to the latter, but if either form is found, it will be transformed. In one example of a transformation, the method F is transformed to not be a sub-expression. A field to hold the IASyncResult is added to the class, and then the call site is transformed in one of any number of ways. If neither form is found, method F is invoked synchronously.

In cases where there are no Begin/End versions of the API, hand-coded bridge methods may allow creating a Task Parallel Library (TPL) Task<T> and wait for its result without blocking, provide a bridge to the CCR model, wait for a timer to go off, and the like. The Task Parallel Library (TPL) is the task parallelism component of the Parallel Extensions to .NET.)

The language based model also supports unordered compositions. In an unordered composition, each async operation is started and completed independently of the operations in the unordered composition. To support unordered composition of asynchronous operations, another keyword, such as "interleave," can be added. In one example, unordered compositions can take the form of a static composition of sub-operations or a dynamic composition of sub-operations. In one example, interleave statements are used directly within the bodies of asynchronous methods.

One example of a static interleave includes the form of:
interleave {op1; op2; op3};
where op1-op3 are statements containing calls to asynchronous methods. The interleave construct finishes when all sub-operations are finished. Subsequent calls to asynchronous methods outside of the interleave operations are performed serially with respect to the unordered operations. For example, in the case of four operations represented with interleave {op1; op2; op3};
async op4;
op 4 is performed subsequent the completion of ops1-op3.

In one example, the dynamic interleave takes a form similar to foreach:
interleave (var x in enumeration)
{
   op(x);
}
where op(x) is dependent on x and contains calls to asynchronous methods.

In example 4, ReadFiles are implemented in an unordered composition:

EXAMPLE 4 public async byte[ ][ ] ReadFiles(string [ ] paths) {
   List byte[ ]> result=new List<byte>( )
   interleave (string path in paths)
   {
   //Calling an async method from an async method, the compiler
   // provides support.
   result.Add(ReadFile9path);
   }
   return result.ToArray( );
}

In one example, interleave is a construct between a serial and a parallel "loop" as it allows each iteration's outstanding asynchronous operation to proceed in parallel with all other operations created by the loop, but it will only run one "copy" of the code of the method at once. When the first iteration pauses, the next iteration is started. When the next operation is paused, the next yet is started until all have started. Once an operation can be resumed, only one operation is resumed and run until it pauses again (which may still involve background work being actively performed), after which another operation may be resumed. This example construct orchestrates the operations without introducing any true parallelism in the user code of the asynchronous method itself. Example framework solutions are also available to those developers that would prefer running the methods in parallel to each other such as TPL, which offer the means to distribute work and run it in parallel.

Examples can include several features relating to branching (goto, return), break, and continue statements. In one example, branch statements can be used within interleave blocks. Returning or branching to a location outside the block cancels all outstanding operations under the interleave statement. An occurrence of "break" nested within an interleave statement cancels all outstanding operations under the interleave statement and continues execution at the first statement after the interleave statement. An occurrence of "continue" nested within a dynamic interleave statement completes the "current iteration" of the interleave statement, but it leaves all other outstanding iterations intact.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of providing asynchronous operations, comprising:

receiving a plurality of operations composed in a synchronous syntax, the synchronous syntax distinguishable from an asynchronous pattern, the plurality of operations including a first asynchronous operation and a second asynchronous operation;

defining the first asynchronous operation and the second asynchronous operation as asynchronous operations in the synchronous syntax; and compiling the defined asynchronous operations in which the first asynchronous operation calls the second the asynchronous operation from a linked stack.

2. The method of claim 1 comprising:

applying a modifier to define the asynchronous operations.

3. The method of claim 2 including implementing the modifier with a language extension keyword.

4. The method of claim 2 wherein the defined asynchronous operations include at least one of methods, delegate declarations, and lambda expressions.

5. The method of claim 2 wherein the modifier is applied to at least one of a class, structure, and interface.

6. The method of claim 1 comprising:

implementing the linked stack to pause and resume the defined asynchronous operations.

7. The method of claim 6 wherein the first asynchronous operation includes a yield point represented by a call to the second asynchronous operation.

8. The method of claim 6 wherein pausing the second asynchronous operation pauses the first asynchronous operation.

9. The method of claim 1 wherein defining the asynchronous operations is inferred from context in the syntax.

10. The method of claim 9 wherein the defined asynchronous operations include a lambda expression.

11. A system to provide asynchronous operations, the system comprising:

memory to store a set of instructions and receive a plurality of operations composed in a synchronous syntax in which the synchronous syntax is distinguishable from an asynchronous pattern; and a processor to execute the set of instructions to:

define a first asynchronous operation and a second asynchronous operation as asynchronous operations in the synchronous syntax; and compile the defined asynchronous operations in which the first asynchronous operation calls the second the asynchronous operation from a linked stack.

12. The system of claim 11 wherein a modifier defines the first asynchronous operation and the second asynchronous operation.

13. The system of claim 11 wherein the asynchronous operations are compiled into an asynchronous programming model.

14. The system of 13 wherein the defined asynchronous operations are compiled into public declarations.

15. The system of claim 14 wherein one of the public declarations calls one of the defined asynchronous operations synchronously.

16. A computer readable storage device to store computer executable instructions to control a processor to:

receive a plurality of operations composed in a synchronous syntax, the synchronous syntax distinguishable from an asynchronous pattern, the plurality of operations including a first asynchronous method and a second asynchronous method;

define the first asynchronous method and the second asynchronous method as asynchronous operations in the synchronous syntax; and compile the defined asynchronous operations in which the first asynchronous method calls the second the asynchronous method from a linked stack.

17. The computer readable device of claim 16 wherein the first asynchronous method and second asynchronous method are compiled into an asynchronous pattern from the synchronous syntax.

18. The computer readable device of claim 17 wherein the asynchronous pattern includes an asynchronous programming model.

19. The computer readable device of claim 16 wherein the first asynchronous method includes a yield point represented by a call to the second asynchronous method.

20. The computer readable device of claim 19 wherein an entire call chain yields at the yield point.

* * * * *